US011327664B1

(12) United States Patent
Jung et al.

(10) Patent No.: US 11,327,664 B1
(45) Date of Patent: May 10, 2022

(54) FAST SMALL WRITE FORWARDING WITH NON-TEMPORAL CACHE MEMORY

(71) Applicant: EMC IP HOLDING COMPANY LLC, Hopkinton, MA (US)

(72) Inventors: Jaeyoo Jung, Shrewsbury, MA (US); Ramesh Doddaiah, Shrewsbury, MA (US); Venkata Khambam, Ballincollig (IE); Earl Medeiros, Fall River, MA (US); Richard Trabing, Uxbridge, MA (US)

(73) Assignee: Dell Products L.P., Hopkinton, MA (US)

( * ) Notice: Subject to any disclaimer, the term of this patent is extended or adjusted under 35 U.S.C. 154(b) by 908 days.

(21) Appl. No.: 15/668,797

(22) Filed: Aug. 4, 2017

(51) Int. Cl.
*G06F 3/06* (2006.01)

(52) U.S. Cl.
CPC ............ *G06F 3/0622* (2013.01); *G06F 3/065* (2013.01); *G06F 3/0619* (2013.01); *G06F 3/0647* (2013.01); *G06F 3/0659* (2013.01); *G06F 3/0683* (2013.01)

(58) Field of Classification Search
CPC .......... G06F 12/0253–0276; G06F 2212/7205; G06F 3/0683–0689; G06F 3/0622; G06F 3/0619; G06F 3/0647; G06F 3/065; G06F 3/0659

See application file for complete search history.

(56) References Cited

U.S. PATENT DOCUMENTS

| | | | | | |
|---|---|---|---|---|---|
| 5,072,378 A | * | 12/1991 | Manka | .................. | G06F 3/0601 714/6.12 |
| 5,459,853 A | * | 10/1995 | Best | ...................... | G06F 3/0601 711/111 |
| 6,085,290 A | * | 7/2000 | Smith | ................. | G06F 12/0853 710/56 |
| 6,256,705 B1 | * | 7/2001 | Li | ......................... | G06F 3/0608 711/112 |
| 8,291,170 B1 | * | 10/2012 | Zhang | ................. | G06F 11/1466 711/135 |
| 8,732,357 B2 | * | 5/2014 | Klein | .................. | G06F 13/4282 710/52 |
| 2001/0013085 A1 | * | 8/2001 | Yamamoto | ............ | G06F 3/0626 711/114 |

(Continued)

OTHER PUBLICATIONS

Christian Plattner et al., "Ganymed: Scalable Replication for Transactional Web Applications", Oct. 22, 2004, ACM, Middleware 2004 International Middleware Conference, pp. 1-20 (Year: 2004).*

(Continued)

*Primary Examiner* — Reginald G Bragdon
*Assistant Examiner* — Curtis James Kortman
(74) *Attorney, Agent, or Firm* — Anderson Gorecki LLP

(57) ABSTRACT

A portion of the shared global memory of a storage array is allocated for write-only blocks. Writes to a same-block of a production device may be accumulated in the allocated portion of memory. Temporal sequencing may be associated with each accumulated version of the same-block. When idle processing resources become available, the oldest group of same-blocks may be consolidated based on the temporal sequencing. The consolidated block may then be destaged to cache slots or managed drives. A group of same-blocks may also be consolidated in response to a read command.

20 Claims, 6 Drawing Sheets

(56) References Cited

U.S. PATENT DOCUMENTS

| | | | | |
|---|---|---|---|---|
| 2002/0069322 A1* | 6/2002 | Galbraith | ............ | G06F 12/0866 |
| | | | | 711/113 |
| 2004/0068612 A1* | 4/2004 | Stolowitz | ............ | G06F 11/1076 |
| | | | | 711/114 |
| 2008/0104591 A1* | 5/2008 | McCrory | ............ | G06F 9/45558 |
| | | | | 718/1 |
| 2013/0185504 A1* | 7/2013 | Ash | ...................... | G06F 12/128 |
| | | | | 711/114 |
| 2016/0342338 A1* | 11/2016 | Wang | .................... | G06F 3/0608 |
| 2017/0351609 A1* | 12/2017 | Ash | ..................... | G06F 12/0804 |
| 2018/0011893 A1* | 1/2018 | Kimura | .............. | G06F 12/0238 |

OTHER PUBLICATIONS

Cecil Le Pape et al., "Refresco: Improving Query Performance Through Freshness Control in a Database Cluster", 2004, Springer, pp. 174-193 (Year: 2004).*

"Circular buffer", Jun. 11, 2016, Wikipedia, revision dated Jun. 11, 2016, pp. 1-5 https://en.wikipedia.org/w/index.php?title=Circular_buffer&oldid=724733214 (Year: 2016).*

File system, Aug. 2, 2016, Wikipedia, the revision date Aug. 2, 2016, pp. 1-25 https://en.wikipedia.org/w/index.php?title=File_system&oldid=732633652 (Year: 2016).*

* cited by examiner

FAST SMALL WRITE FORWARDING WITH NON-TEMPORAL CACHE MEMORY

TECHNICAL FIELD

The subject matter of this disclosure is generally related to data storage systems that may be used to maintain data for multiple host servers and many concurrent users.

BACKGROUND

Host servers may run host applications such as a database, file server or block server, for example and without limitation. Host application data may be maintained by a storage system such as a storage array. A single storage array may maintain the host application data used by multiple host applications running on multiple host servers. Each storage array may include a plurality of interconnected computing nodes and a plurality of data storage devices such as HDDs (Hard Disk Drives) and SSDs (Solid State Drives). The host application data is stored on the data storage devices. The computing nodes manage access to the data storage devices.

SUMMARY

All examples, aspects, features, and implementations mentioned in this document can be combined in any technically possible way.

In accordance with an aspect an apparatus comprises: a storage array comprising: a plurality of computing nodes that present a production device and manage access to persistent storage drives, each of the computing nodes comprising memory, a portion the memory being allocated to a shared memory that can be accessed by other ones of the plurality of computing nodes, a first portion of the shared memory being allocated for write-only blocks and a second portion of the shared memory being allocated for tracks; and a block write service processor that writes a plurality of versions of a same-block of the production device to the first portion of the shared memory, each version having a temporal sequence associated therewith. In some implementations the block write service processor allocates a fixed-size buffer in the first portion of the shared memory in response to a write command from a host computer. In some implementations the block write service processor sends a transfer ready message to the host computer after the buffer is allocated. In some implementations the block write service processor receives a same-block of data in response to the transfer ready message, and sends an ACK to the host computer after writing the same-block into the allocated buffer. Some implementations further comprise a block write aggregation processor that associates temporal sequencing with the same-block. Some implementations further comprise an aggregation scheduler, responsive to system idle feedback, to prompt the block write aggregation processor to consolidate a selected accumulated group of versioned blocks in the first portion of the shared memory. In some implementations the aggregation schedule selects an oldest group of same-blocks. In some implementations the block write aggregation processor consolidates the selected group of same-blocks based on temporal sequencing, thereby generating a consolidated block. In some implementations the block write aggregation processor destages the consolidated block to the persistent storage drives or the second portion of the shared memory. In some implementations, responsive to a command from a host computer to read a same-block that is present in the first portion of the shared memory, the block write aggregation processor consolidates all versions of the same-block based on temporal sequencing to generate a consolidated block, and returns the consolidated block to the host computer.

In accordance with an aspect a method comprises: in a storage array comprising a plurality of computing nodes that present a production device and manage access to persistent storage drives, each of the computing nodes comprising memory, a portion the memory being allocated to a shared memory that can be accessed by other ones of the plurality of computing nodes: allocating a first portion of the shared memory for write-only blocks; allocating a second portion of the shared memory for tracks; writing a plurality of versions of a same-block of the production device to the first portion of the shared memory; and associating a temporal sequence with each of the plurality of versions of the same-block. Some implementations comprise allocating a fixed-size buffer in the first portion of the shared memory in response to a write command from a host computer. Some implementations comprise sending a transfer ready message to the host computer after the buffer is allocated. Some implementations comprise receiving a same-block of data in response to the transfer ready message, and sending an ACK to the host computer after writing the same-block into the allocated buffer. Some implementations comprise associating a temporal sequencing with the same-block. Some implementations comprise, responsive to system idle feedback, consolidating a selected accumulated group of versioned blocks in the first portion of the shared memory. Some implementations comprise selecting an oldest group of same-blocks for consolidation. Some implementations comprise consolidating the selected group of same-blocks based on temporal sequencing, thereby generating a consolidated block. Some implementations comprise destaging the consolidated block to the persistent storage drives or the second portion of the shared memory. Some implementations comprise, responsive to a command from a host computer to read a same-block that is present in the first portion of the shared memory, consolidating all versions of the same-block based on temporal sequencing to generate a consolidated block, and returning the consolidated block to the host computer.

DETAILED DESCRIPTION

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features, including but not limited to hardware. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors.

Figure 1:
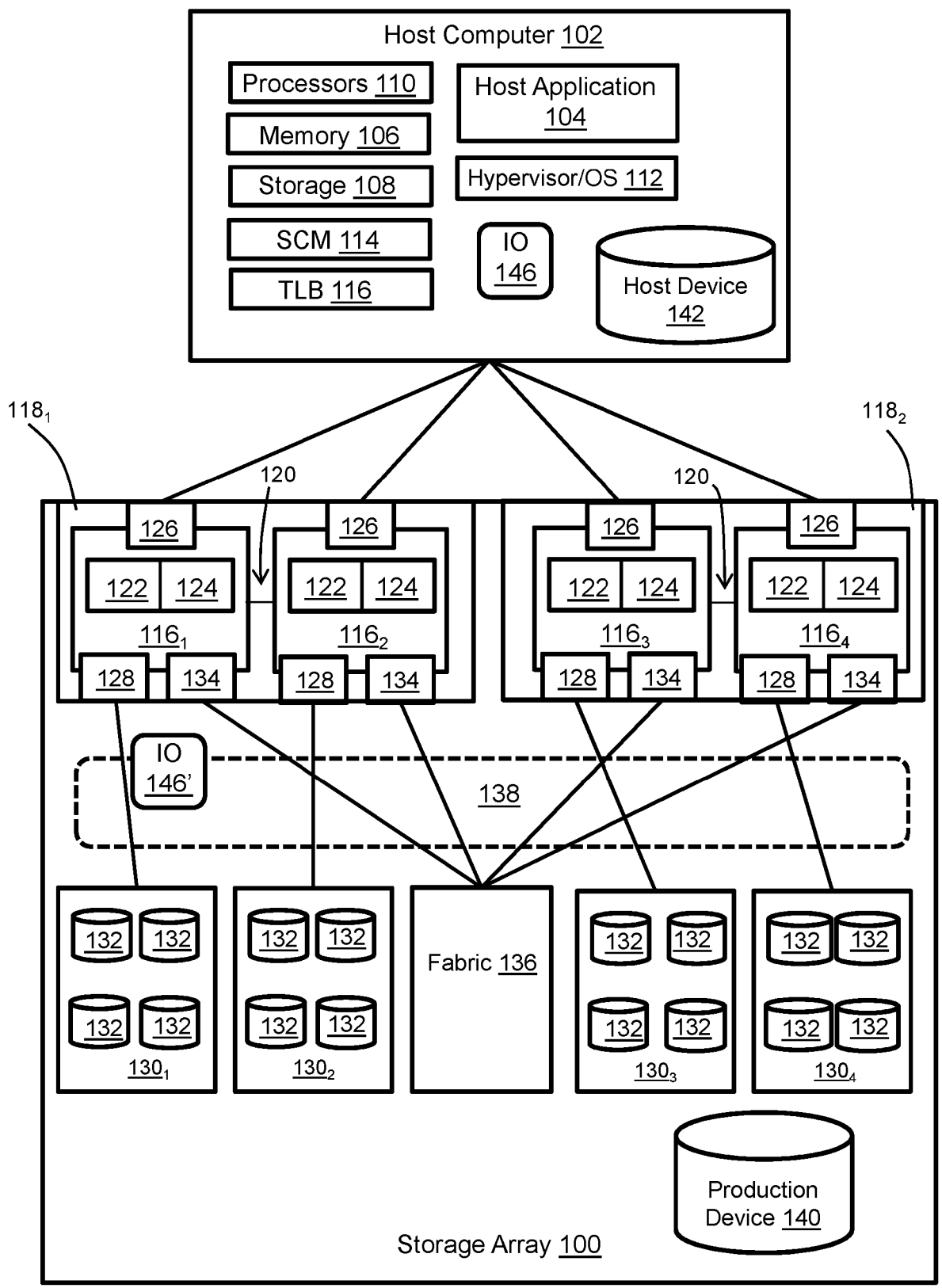
FIG. 1 is a block diagram of a host server and a storage array.

FIG. 1 illustrates an exemplary storage array 100 and associated host computer 102, of which there may be many. The storage array 100 maintains data for a host application 104, of which there may be more than one instance and type running on the host computer 102. In the illustrated example the host computer 102 is a server with volatile memory 106, persistent storage 108, one or more tangible processors 110, and a hypervisor or OS (operating system) 112. The volatile memory may include RAM (Random Access Memory) of any type. The persistent storage 108 may include tangible persistent storage components of one or more technology types, for example and without limitation SSDs and HDDs of any type, including but not limited to SCM (Storage Class Memory), EFDs (enterprise flash drives), SATA (Serial Advanced Technology Attachment) and FC (Fibre Channel). The host computer 102 might support multiple virtual hosts running on virtual machines or containers, and although an external host computer is illustrated, internal hosts may be instantiated within the storage array.

The storage array 100 includes a plurality of computing nodes $116_1$-$116_4$, possibly including but not limited to storage servers and specially designed compute engines or storage directors for providing data storage services. Pairs of the computing nodes, e.g. ($116_1$, $116_2$) and ($116_3$, $116_4$), may be organized as storage engines $118_1$, $118_2$, respectively, for purposes of failover between computing nodes. The paired computing nodes of each storage engine may be directly interconnected by communication links 120. Each computing node includes at least one tangible multi-core processor 122 and a local volatile memory 124. The local volatile memory 124 may include, for example and without limitation, components such as RAM. Each computing node may also include one or more FEs (front end adapters) 126 for communicating with the host computer 102. Each computing node $116_1$-$116_4$ may also include one or more BEs (back end adapters) 128 for communicating with respective associated back end drive arrays $130_1$-$130_4$, thereby enabling access to managed drives 132. The managed drives 132 may include tangible persistent storage components of one or more technology types, for example and without limitation any of the SSDs and HDDs mentioned above. Each computing node may also include one or more CAs (channel adapters) 134 for communicating with other computing nodes via an interconnecting fabric 136. Each computing node may allocate a portion or partition of its respective local volatile memory 124 to a virtual shared "global" memory 138 that can be accessed by other computing nodes, e.g. via DMA (direct memory access) or RDMA (remote direct memory access).

The storage array 100 maintains data for the host applications running on the host computer 102. For example, host application 104 may write host application data to the storage array and read host application data from the storage array in order to perform various functions. Examples of host applications may include but are not limited to file servers, email servers, block servers and databases. Logical storage devices are created and presented to the host application 104 for storage of the host application data. For example, a production device 140 and a corresponding host device 142 are created to enable the storage array to provide storage services to the host application 104. Without limitation, the production device 140 may be referred to as a production device, production volume, production LUN or host LUN, where LUN (Logical Unit Number) is a number used to identify the logical storage volume in accordance with the SCSI (Small Computer System Interface) protocol. The host device 142 is a local (to host computer 102) representation of the production device 140. Multiple host devices associated with different host computers may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application resides and can be stored. However, the data used by the host application and the storage resources available for use by the host application may actually be maintained by the computing nodes $116_1$-$116_4$ at non-contiguous addresses on various different managed drives 132.

In order to service IOs from the host application 104, the storage array 100 maintains metadata that indicates, among various things, mappings between the production device 140 and the locations of extents of host application data in the shared global memory 138 and the managed drives 132. In response to an IO (input/output command) 146 from the host application 104 to host device 142, the hypervisor/OS 112 determines whether the IO 146 can be serviced by accessing the host computer memory 106. If that is not possible then the IO is serviced by to the storage array 100. There may be multiple paths between the host computer 102 and the storage array 100, e.g. one path per FE 126. The paths may be selected based on a wide variety of techniques and algorithms including, for context and without limitation, performance and load balancing. In the case where IO 146 is a read command the storage array 100 uses metadata to locate the commanded data, e.g. in the shared global memory 138 or managed drives 132. The commanded data is retrieved using an internal IO 146' within the storage array 100. If the commanded data is not in the shared global memory 138 then the data is temporarily copied into the shared global memory from the managed drives 132 in response to internal IO 146' and sent to the host application via one of the computing nodes. In the case where the IO 146 is a write command the storage array may copy a block being updated into the shared global memory 138, mark the data as dirty, and create new metadata that maps the production device address with a location to which the block is written on the managed drives. The shared global memory 138 may enable the production device 140 to be reachable via all of the computing nodes and paths, although the storage array can be configured to limit use of certain paths to certain production devices.

IO 146 and corresponding internal IO 146' may reference different basic allocation units. More particularly, the size of the data allocation units referenced by IO 146 may be either larger or smaller than the size of the data allocation units referenced by internal IO 146'. The production device 140 and the managed drives 132 in the drive arrays each have a total storage capacity that is organized into various fixed size units of storage capacity for management purposes. A sector may be the smallest unit of storage that a managed drive 132 processes, e.g. providing a sector in response to a read or overwriting a sector in response to a write. On a spinning disk HDD a track may correspond to a concentric band on the disk and a sector may be a portion of such a concentric band. For example and without limitation, 1 sector may be 512 bytes. 1 block may be 8 sectors, and 1 track may be 32 sectors. 1 cylinder may be 15 tracks. In order for the storage array metadata to be manageable, a fixed size allocation unit of storage capacity may be used by the computing nodes as a basic unit for processing internal IOs such as IO 146'. For example and without limitation, the computing nodes may read and write from and to the shared global memory and drive arrays in fixed size allocation units such as tracks. The size of the allocation units is generally proportional to the manageability of the metadata, but inversely proportional to resource utilization efficiency when retrieving data from the managed drives. The host application 104 and host computer 102 may read and write from the production device 140 in allocation units of a different fixed size, for example and without limitation blocks. Such misalignment between blocks and tracks may cause inefficiency and contribute to IO latency.

Figure 2:
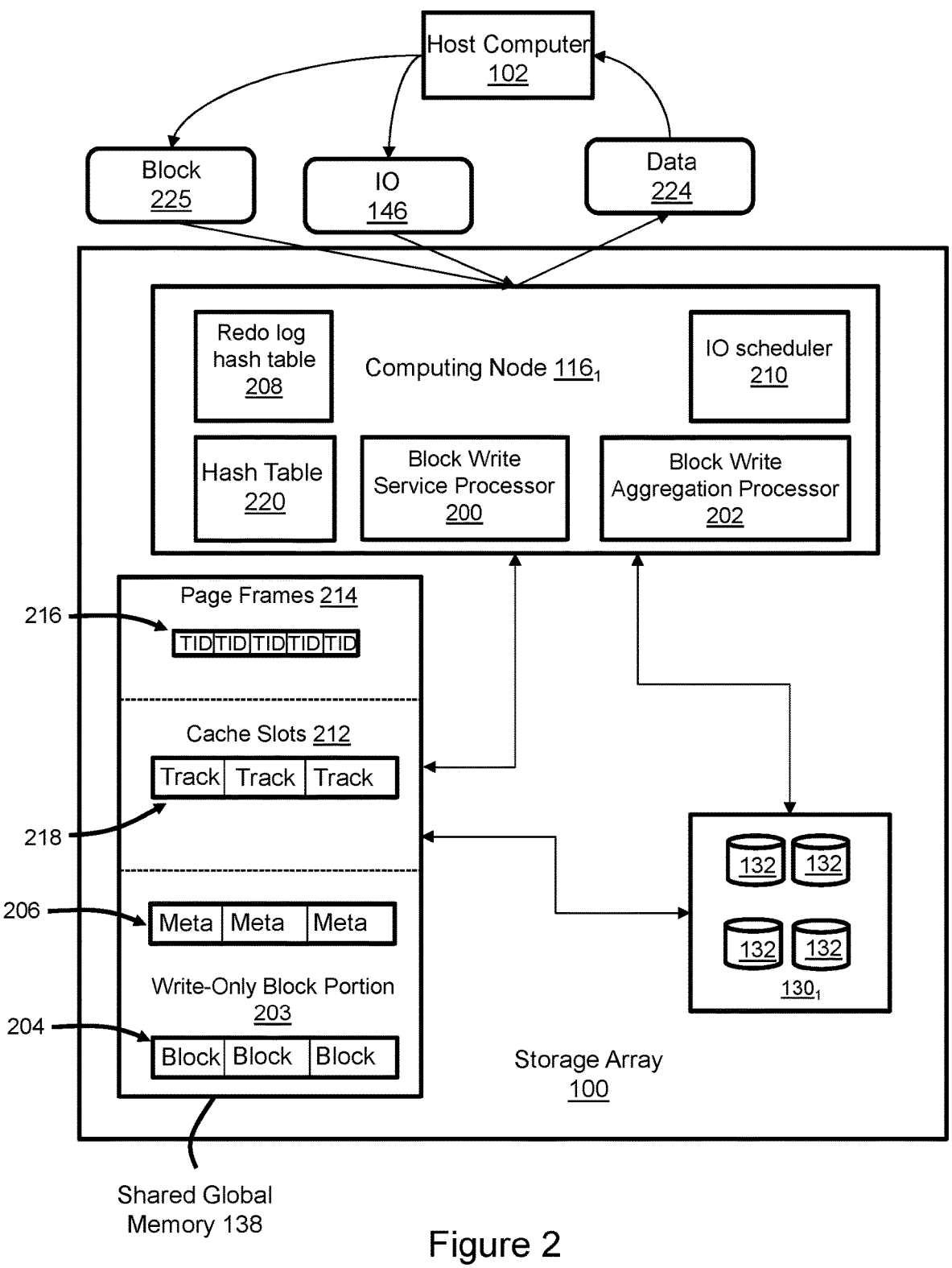
FIG. 2 is a functional block diagram of a storage array processing an IO from a host server.

Referring to FIG. 2, exemplary computing node 116₁ includes features that help to overcome some of the drawbacks of allocation unit size misalignment. A block write service processor 200 and a block write aggregation processor 202 manage a portion 203 of the shared global memory 138 that is allocated for storage of non-temporal write-only blocks 204 of data. The allocated portion 203 of the shared global memory may include contiguous 8 KB aligned, non-temporal buffers, for example and without limitation. The size of the buffers may be selected to coincide with, or be a multiple or fraction of, the block 225 size used by the host computer 102, host application or storage array processors, for example and without limitation. The block write service processor 200 receives a block from the host computer 102, e.g. block 225 in association with a write command in IO 146, and stores the block 225 as one of the write-only blocks 204. Write-only block metadata 206 may be maintained in the portion 203 of the shared global memory 138 allocated for the write-only blocks.

The block write aggregation processor 202 performs block write version arbitration in order to protect the data in the write-only blocks 204 against corruption. More specifically, the block write aggregation processor 202 adds temporal sequencing to the blocks based on the host application write commands so that a block is not updated in non-temporal order, e.g. overwritten by a stale version. A redo log hash table 208 may be used to search and locate the different "write versions" of a selected production volume block in the write-only blocks 204 based on the sequencing. A wide variety of descriptive data structures could be used, of which a hash table is only one example. An IO scheduler 210 copies consolidated blocks from the write-only blocks to cache slots 212 or managed drives 132 of drive array 130₁.

Conventional cache slots 212 may also be used to service IOs from the host computer 102, e.g. and without limitation reads to data that is not in the write-only blocks 204. Cache slot metadata may be maintained in page frames 214 in an allocated portion of the shared global memory 138. The page frames 214 may include TIDs (track ID tables) that contain pointers to host application data located in fixed-size tracks 218 in the cache slots 212. The TIDs may be maintained in fixed-size pages 216, e.g. and without limitation 4 KB, where each page holds multiple TIDs. Computing node 116₁ may identify TIDs corresponding to IO 146 by inputting the device number, cylinder number, head (track) and size obtained from the IO 146 into a hash table 220. A wide variety of descriptive data structures could be used, of which a hash table is only one example. The hash table 220 indicates the locations of TIDs in the page frames 214, e.g. by outputting a page number. The page number is used to obtain the page that holds the TIDs. The TIDs are used to find and retrieve the corresponding data. If the data is in the cache slots then it is obtained directly from the cache slots. If the data is not in the cache slots then the TIDs are used to obtain the host application data from the managed drives 132. In particular, the data may be copied from the managed drives into the cache slots. In the case of a Read IO the data 224 may then be returned to the host 102.

Although there are no particular advantages that are necessarily part of any aspect, writes to the non-temporal write-only blocks may help to reduce IO response time in comparison with exclusive use of conventional tracks for random size writes. Writes to the non-temporal write-only blocks may also help to improve utilization efficiency of the shared global memory and reduce cache slot lock contention. When using tracks exclusively, a full track may be locked in the managed drives and copied into the shared global memory in response to an IO that updates only a single block within that track. Subsequent writes to that block and nearby blocks may be implemented in the shared global memory and subsequently destaged to the managed drives, but the writes are temporally implemented, i.e., implemented in the order in which they are received, and only when the lock is released after completion of the previous write. This can result in lock contention. Accumulating versioned block writes may enable writes to be ACK'ed without waiting for release of track locks.

Figure 3:
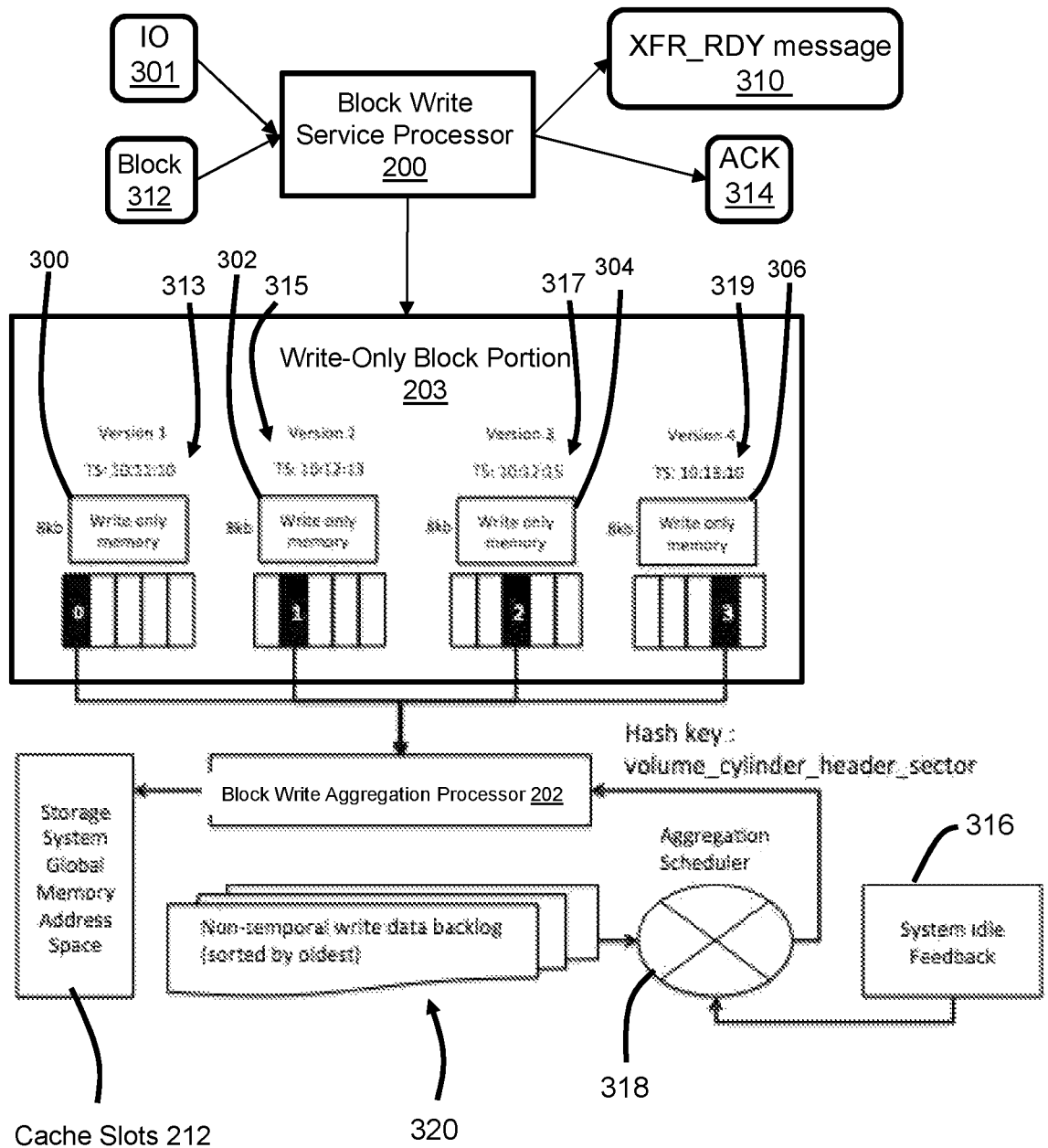
FIG. 3 illustrates operation of the block write service processor and block write aggregation processor in greater detail.

FIG. 3 illustrates operation of the block write service processor 200 and block write aggregation processor 202 in greater detail. The block write service processor 200 receives a block write command in IO 301 indicating a write to the production device. In response, the block write service processor allocates an 8 KB non-temporal buffer 300 in the write-only block portion 203 of the global shared memory. The block write service processor 200 then sends a XFR_RDY message 310 to the host computer to indicate readiness for data transfer, in response to which a data block 312 is sent by the host computer and received by the storage array. A timestamp 313 may be recorded to indicate time of receipt of the data block 312. The arriving data block 312 is stored in the allocated buffer 300. The memory address is stored in a block aggregation hash table. Once the location of the buffer 300 is recorded in the hash table, an ACK 314 may be sent to the host computer by the block write service processor 200. Subsequent additional writes to the same block of the production device may be received while the data block is still resident in the write-only block portion of the shared global memory. In response to those writes the block write service processor 202 may allocate additional contiguous 8 KB aligned, non-temporal buffers 302, 304, 306 for the data blocks, and record corresponding timestamps 315, 317, 319 indicating when the respective data blocks are received.

The block write aggregation processor 202 performs write version arbitration in order to protect the data associated with the same block of the production device (i.e. the "same-block"). More specifically, the block write aggregation processor 202 provides temporal sequencing of received data blocks associated with the host application write commands, e.g. 0, 1, 2, 3 corresponding to version 1, version 2, version 3 and version 4 of the same production device block. The block write aggregation processor 202 also records metadata corresponding to each version in the write-only blocks. The metadata may include but is not limited to volume number, logical block address, logical block count, cylinder, head, and its block version number. The version number is uniquely and atomically created for each 8 KB data size buffer boundary. Thus, the write-only block portion 203 of shared global memory simultaneously contains multiple dirty versions of the same production device block.

In response to system idle feedback 316 that indicates when the block write service processor 200 is underutilized, an aggregation scheduler 318 prompts the block write aggregation processor 202 to consolidate the accumulated group of versioned blocks in the 8 KB buffers 300, 302, 304, 306. The utilization of the block write service processor may be measured by the FA system idle state derived from the FA queue depth in order to provide the system idle feedback 316. The aggregation scheduler 318 fetches a versioned group of same-blocks from write-only block portion 203 for consolidation using an old data first algorithm based on records 320 of non-temporal write data backlog. In other words, the oldest group of same-blocks is selected for consolidation as processor resources become available. The block write aggregation processor keeps a list of overlapped extents in the hash table and consolidates the selected group of same-blocks. For purposes of consolidation, the arrival order of the same-block data as indicated by the version numbers is used to determine the order of updates, ranged from 0 to 3 in the illustrated example, where the earlier arrived IO takes the lower version number and the latest arrived IO takes the last version number. Consequently, version 1 is updated by version 2, the consolidated result of which is updated by version 3, the consolidated result of which is updated by version 4. The consolidated block resulting from consolidation may be written into the cache slots 212 and subsequently destaged to the managed drives, or written directly into the managed drives.

Figure 4:
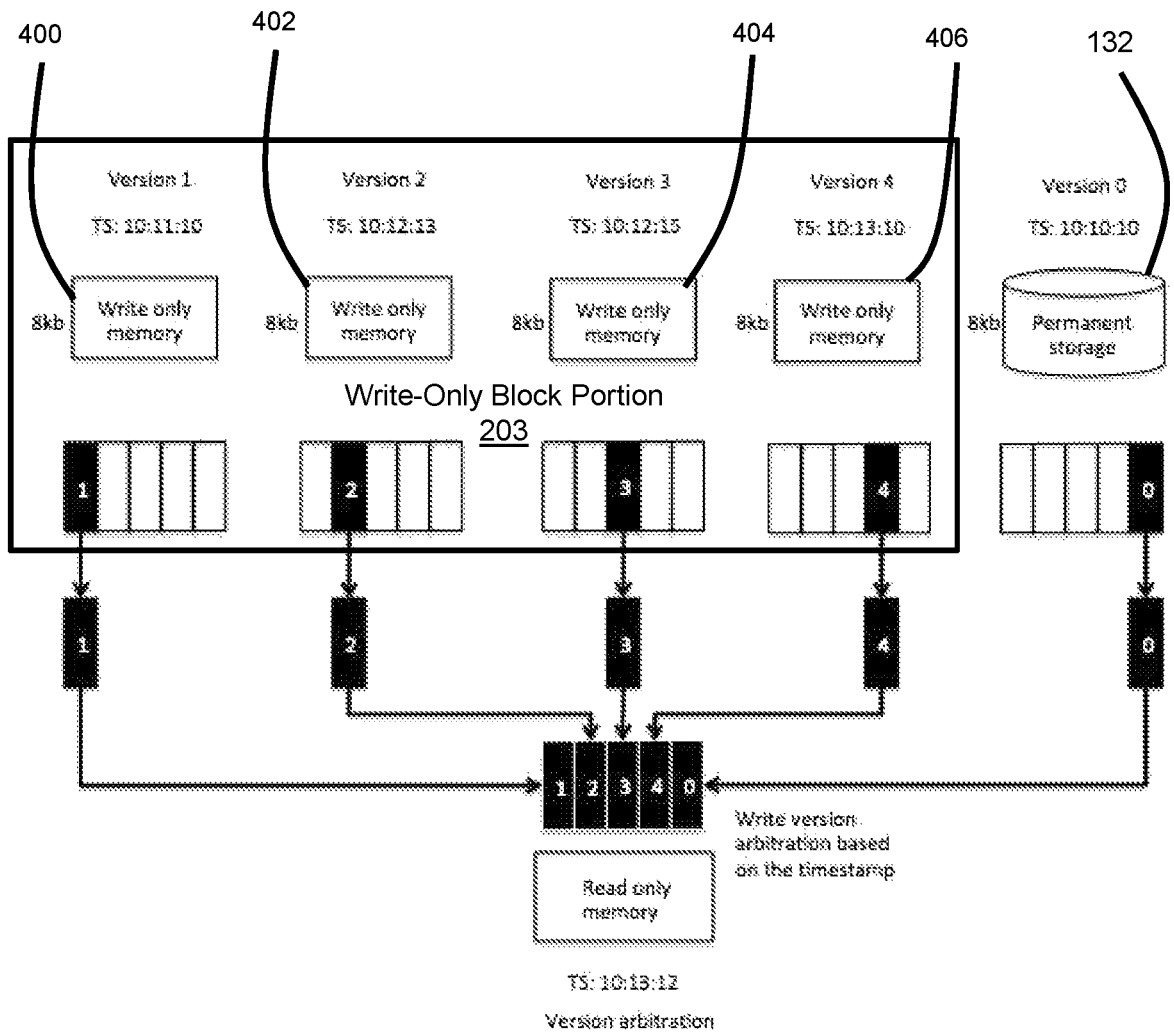
FIG. 4 illustrates block version arbitration on read.

FIG. 4 illustrates write version arbitration on read using the write-only block portion 203 of shared global memory. Reads to blocks that are not present in write-only block portion 203 may be processed as described above, e.g. and without limitation using the TIDs and cache slots. If the read is to a block that is resident in the write-only block portion 203 then a version 0 of the block is obtained from the managed drives 132 (if it is not available from the non-temporal write list table), and written to the write-only block portion 203. The group of related versions 1, 2, 3, 4 of that block in buffers 400, 402, 404, 406 are consolidated with the retrieved version 0 in order by ascending version number as already described above. The resulting consolidated block is sent to the host computer in response to the read.

Figure 5:
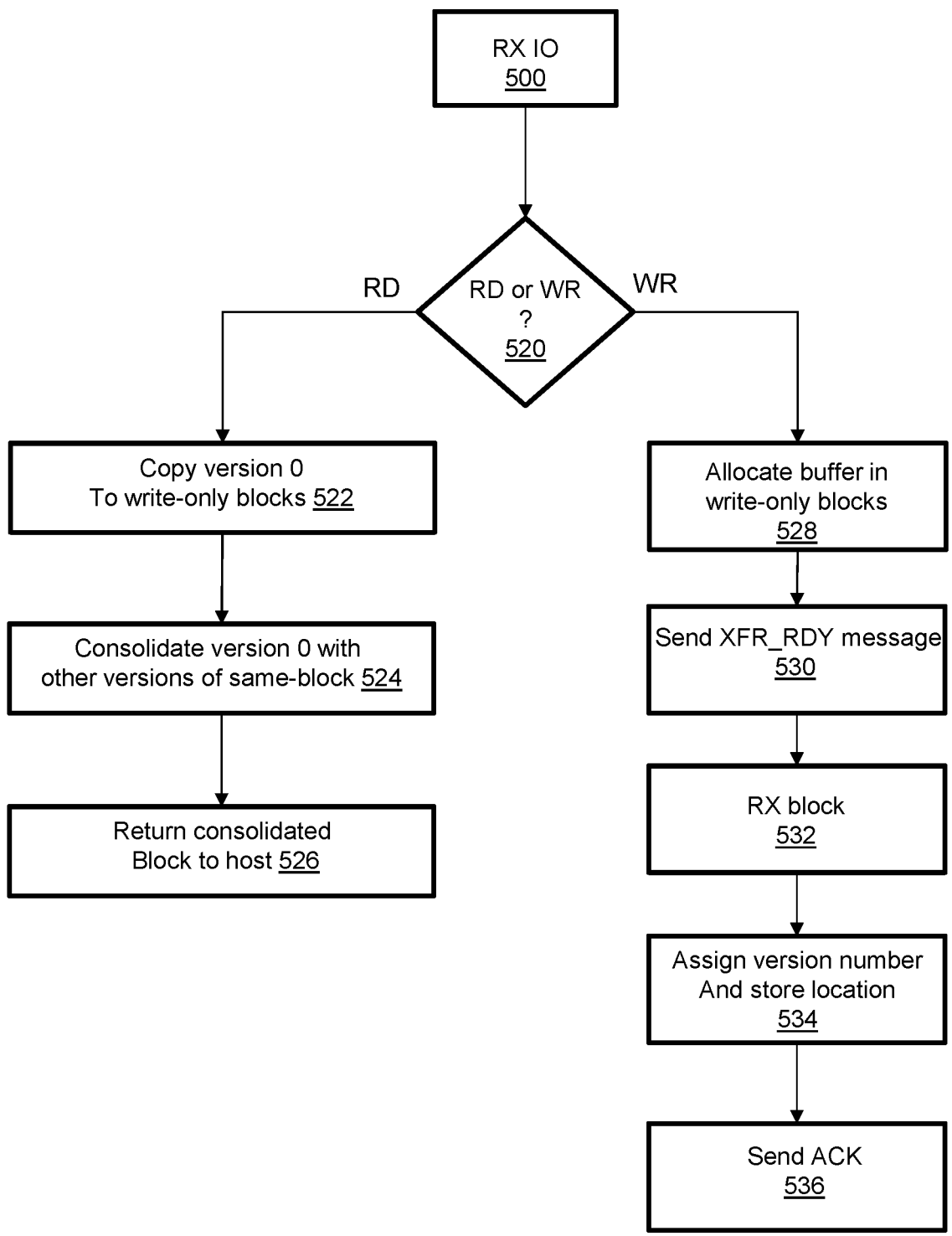
FIG. 5 is a flow diagram of block write forwarding with non-temporal memory.

FIG. 5 is a flow diagram of block write forwarding with non-temporal memory. In response to receipt of an IO command as indicated in block 500, a determination is made as to whether the IO command is a read or write as indicated in decision block 520. In the case of a read, version 0 of the block is copied into the write-only blocks as indicated in block 522. For example and without limitation, the version 0 block may be copied from the managed drives. The version 0 block is consolidated with other versions of the same-block as indicated in block 524. The consolidated block is returned to the host as indicated in block 526. In the case of a write, as determined in decision block 520, a buffer is allocated in the write-only blocks as indicated in block 528. A XFR_RDY message is then sent to the host computer as indicated in block 530. The block being written is received b the storage array as indicated in blocks 534. The received block is assigned a temporal version number and its location stored as indicated in block 534. An ACK is then sent to the host computer as indicated in block 536.

Figure 6:
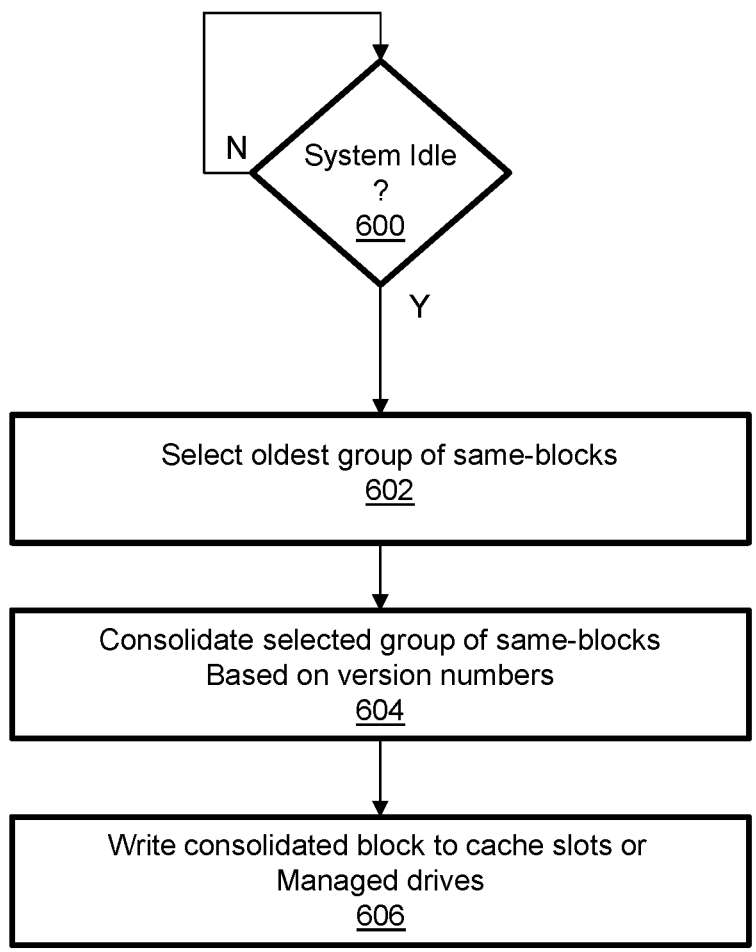
FIG. 6 is a flow diagram of block write version consolidation.

FIG. 6 is a flow diagram of block write version consolidation. When the system is sufficiently idle as determined in decision block 600, the oldest group of versioned same-blocks is selected as indicated in block 602. The selected group of same blocks is consolidated based on the temporal version numbers as indicated in block 604. The result is a consolidated block that represents all updates implemented in the order in which the associated IOs were received. The consolidated block is written to the cache slots or managed drives as indicated in block 606.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
 a storage array comprising:
  a plurality of computing nodes that present a production device and manage access to persistent storage drives, each of the computing nodes comprising memory, a portion of the memory being allocated to a shared memory that can be accessed by other ones of the plurality of computing nodes, a first portion of the shared memory being allocated for write-only blocks and a second portion of the shared memory being allocated for readable and writable tracks, wherein the tracks are larger than the blocks; and
  a block write service processor that writes a plurality of versions of a same-block of the production device to the first portion of the shared memory, each version having a temporal sequence associated therewith.

2. The apparatus of claim 1 wherein the block write service processor allocates a fixed-size buffer in the first portion of the shared memory in response to a write command from a host computer.

3. The apparatus of claim 2 wherein the block write service processor sends a transfer ready message to the host computer after the buffer is allocated.

4. The apparatus of claim 3 wherein the block write service processor receives a version of the same-block of data in response to the transfer ready message, and sends an ACK to the host computer after writing the version of the same-block into the allocated buffer.

5. The apparatus of claim 4 further comprising a block write aggregation processor that associates the temporal sequence with the corresponding version of the same-block.

6. The apparatus of claim 5 further comprising an aggregation scheduler, responsive to system idle feedback, to prompt the block write aggregation processor to consolidate a selected accumulated group of the plurality of versions of the same-block in the first portion of the shared memory.

7. The apparatus of claim 6 wherein the aggregation scheduler selects an oldest group of the plurality of versions of the same-block as the selected accumulated group.

8. The apparatus of claim 7 wherein the block write aggregation processor consolidates the selected accumulated group of the plurality of versions of the same-block based on the temporal sequence, thereby generating a consolidated block.

9. The apparatus of claim 8 wherein the block write aggregation processor destages the consolidated block to the persistent storage drives or the second portion of the shared memory.

10. The apparatus of claim 1 wherein, responsive to a command from a host computer to read the same-block that is present in the first portion of the shared memory, the block write aggregation processor consolidates the plurality of versions of the same-block based on the temporal sequence to generate a consolidated block, and returns the consolidated block to the host computer.

11. A method comprising:
in a storage array comprising a plurality of computing nodes that present a production device and manage access to persistent storage drives, each of the computing nodes comprising memory, a portion of the memory being allocated to a shared memory that can be accessed by other ones of the plurality of computing nodes:
allocating a first portion of the shared memory for write-only blocks;
allocating a second portion of the shared memory for readable and writable tracks, wherein the tracks are larger than the blocks;
writing a plurality of versions of a same-block of the production device to the first portion of the shared memory; and
associating a temporal sequence with each of the plurality of versions of the same-block.

12. The method of claim 11 comprising allocating a fixed-size buffer in the first portion of the shared memory in response to a write command from a host computer.

13. The method of claim 12 comprising sending a transfer ready message to the host computer after the buffer is allocated.

14. The method of claim 13 comprising receiving a version of the same-block of data in response to the transfer ready message, and sending an ACK to the host computer after writing the version of the same-block into the allocated buffer.

15. The method of claim 14 comprising a block write aggregation processor associating the temporal sequence with the corresponding version of the same-block.

16. The method of claim 15 comprising, responsive to system idle feedback, consolidating a selected accumulated group of the plurality of versions of the same-block in the first portion of the shared memory.

17. The method of claim 16 comprising selecting an oldest group of the plurality of versions of the same-block as the selected accumulated group.

18. The method of claim 17 comprising consolidating the selected accumulated group of the plurality of versions of the same-block based on the temporal sequence, thereby generating a consolidated block.

19. The method of claim 18 comprising destaging the consolidated block to the persistent storage drives or the second portion of the shared memory.

20. The method of claim 11 comprising, responsive to a command from a host computer to read the same-block that is present in the first portion of the shared memory, consolidating the plurality of versions of the same-block based on the temporal sequence to generate a consolidated block, and returning the consolidated block to the host computer.

* * * * *